United States Patent [19]
Vreeland

[11] Patent Number: 4,607,208
[45] Date of Patent: Aug. 19, 1986

[54] BATTERY CHARGER

[75] Inventor: Stewart W. Vreeland, San Diego, Calif.

[73] Assignee: The United States of America as represented by the Secretary of the Navy, Washington, D.C.

[21] Appl. No.: 636,038

[22] Filed: Jul. 30, 1984

[51] Int. Cl.<sup>4</sup> .............................................. H02J 7/10
[52] U.S. Cl. ..................................... 320/21; 320/32; 320/35; 320/37; 320/39
[58] Field of Search ...................... 320/20, 21, 22-24, 320/32, 35, 36, 37, 38, 39

[56] References Cited

U.S. PATENT DOCUMENTS

| | | | |
|---|---|---|---|
| 4,371,826 | 2/1983 | Shelly | 320/32 X |
| 4,389,608 | 6/1983 | Dahl et al. | 320/48 X |
| 4,439,719 | 3/1984 | Lambert et al. | 320/37 X |
| 4,472,672 | 9/1984 | Pacholok | 320/32 X |
| 4,554,500 | 11/1985 | Sokira | 320/21 X |
| 4,564,800 | 1/1986 | Jurjans | 320/21 X |

*Primary Examiner*—R. J. Hickey
*Attorney, Agent, or Firm*—Robert F. Beers; Robert W. Adams

[57] ABSTRACT

A battery charger analyzer utilizing a down pulse configuration employs a number of power switching transistors driven from a pulse-width modulator in a control section which monitors and analyzes the battery temperature, charge condition, current provided, and length of time in the charge cycle, all of which affect the operation of the pulsewidth modulator and thereby the charge supplied to the battery. The charger analyzer supplies 95% of the battery charge at either of two selected charging rates.

20 Claims, 7 Drawing Figures

TI = 1 SECOND TO SEVERAL HOURS
T2 = TI X CONSTANT
TI & T2 = TOTAL CONSTANT CURRENT CHARGE TIME, VARIABLE IN ACCORDANCE WITH CHARGE REQUIRED BY BATTERY

BATTERY CHARGER

BACKGROUND OF THE INVENTION

This invention relates generally to the field of battery chargers and more particularly to battery chargers of the down pulse switching type. More particularly, the present invention may be described as a charger analyzer which adjusts its charge profile to battery voltage characteristics which are a result of charge current and temperature.

Generally speaking, the present invention provides the means by which a battery may be charged to a level of 95% of maximum charge during a minimum time by the application of a constant current over a predetermined time interval, unless the peak battery voltage is attained in a time less than the normal charge time for a fully discharged battery.

DESCRIPTION OF THE PRIOR ART

In U.S. Pat. No. 3,887,858, a battery charger for a lead acid cell type battery is shown wherein the terminal voltage of the battery is monitored and a constant current is supplied to charge the battery for two time intervals bearing a fixed relationship therebetween, thereby reaching a predetermined level of overcharge and thereafter applying a trickle charge. The circuit uses silicon controlled rectifiers as switches and control devices, and employs a physically determined interval between the aforementioned time intervals.

Likewise, U.S. Pat. No. 3,748,567 operates on the same theory and monitors the battery's terminal or "reversing" voltage to determine the length of time of two charging intervals having a fixed temporal ratio such that the battery is overcharged to a predetermined level.

U.S. Pat. No. 3,230,439 discloses a charger for a nickel cadmium type battery wherein a mechanical cam serves as a timer for each of two charging intervals, said cam operating to provide a fixed temporal relationship therebetween.

U.S. Pat. No. 3,178,629 also utilizes the same voltage characteristics of the battery to deliver an overcharge; however, the timer means disclosed also alters the charging rate of the battery.

The instant battery charger provides maximum charge into a battery in minimum time, automatically, without respect to the amount of existing battery charge and temperature. The charge profile automatically adjusts to battery voltage characteristics which are a result of charge current and temperature. The charger is self-monitoring and provides only enough charge to satisfy 95% of the charge depletion of the battery being charged.

A timer within the charger-analyzer counts up until it reaches a predetermined time or the battery attains a peak voltage, at which time the counter reverses. Upon the counter reaching "0", the charger switches from constant current to constant voltage charging. This charging scheme reduces maintenance and memory effect in sintered plate nickel cadmium batteries. The detailed description will present the battery charger as having three major components: the main chassis and switching circuitry; the control circuitry; and the timer circuitry.

The combination of features of the present invention provides a battery charger analyzer capable of adapting to the state of charge of the battery without overcharging a battery.

Another object of the invention is to provide a charging apparatus which automatically insures proper charge regardless of the type of battery.

Another object of the invention is to provide a charging apparatus which is self-monitoring for the particular charge rate selected.

These and other objects and features of the invention will become apparent from the description of the preferred embodiment when read in conjunction with the attached drawing wherein like numerals refer to the same components in each figure.

DESCRIPTION OF A PREFERRED EMBODIMENT

The battery charger described herein is a constant current power supply that is controlled by battery voltage, battery temperature, and an interval timer.

The basic design of the instant battery charger is of the down pulser switching type. During the charge cycle the unit delivers a timer controlled constant current, and thereafter delivers a constant voltage during a trickle charge cycle. In a down pulser a higher voltage DC source is switched on and off into an output filter. The output of the filter is the output of the battery charger and is at a lower voltage than the DC source. By varying the duration of time that the switch is closed, the output of the battery charger can be regulated.

In order to help smooth the output and allow for the proper functioning of the battery charger, a coasting diode is used. The switch may be placed in either leg, i.e., output to or return from the battery, and is in the return leg in the illustrated embodiment. The embodiment described is designed to deliver a charge level at 55 amperes for 92 minutes, or at 30 amperes for 8.25 hour.

Figure 1:
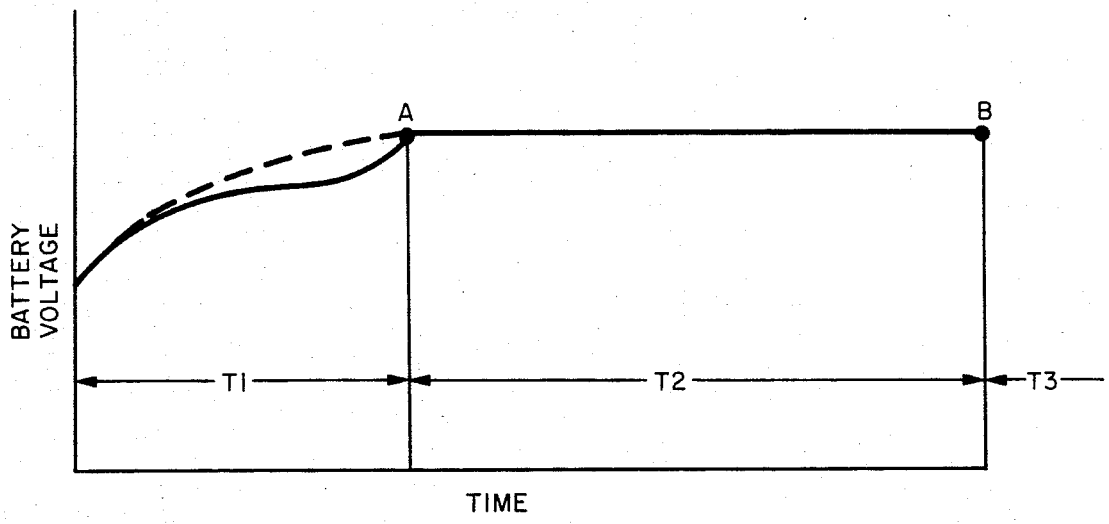
FIG. 1 is a depiction of the voltage output characteristics of a battery being charged.

With reference to FIG. 1, as is well known, when charger input power is applied, battery voltage will rise. If the battery is almost fully charged, the voltage characteristics will approximate that of the broken line and T1 will last only a few moments. Otherwise, the voltage-time curve will approximate the solid line and T1 will be much longer. During T1 an internal timer 300, shown in FIG. 2 and FIG. 6, counts up until the voltage level at point "A" is reached or a maximum count is attained. The timer then switches from a count up to count down for T2. At the end of T2 the constant current charge mode changes to constant voltage charge for so long as power is maintained to the battery charger.

Figure 2:
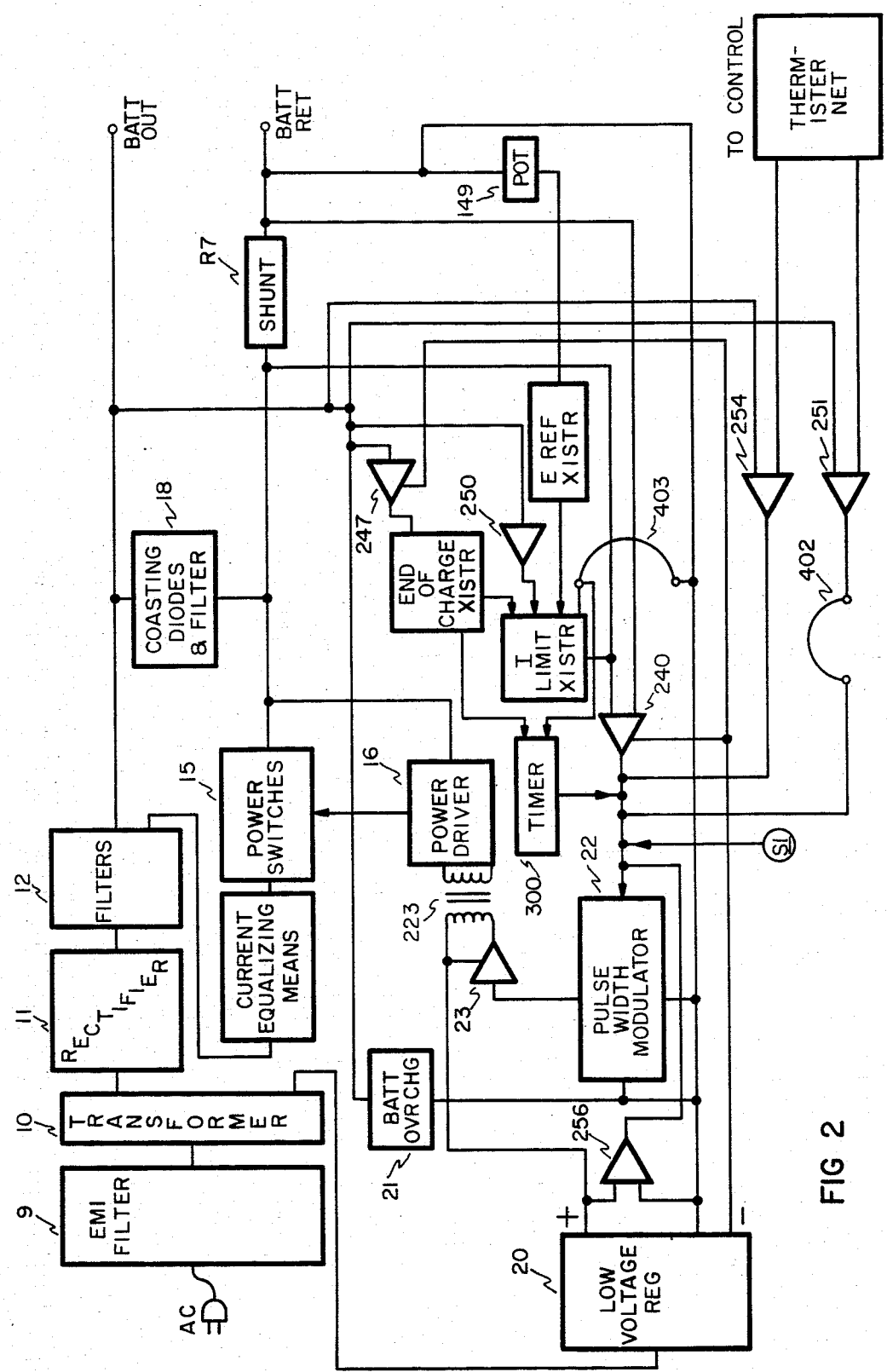
FIG. 2 is a block diagram of the battery charger.

With reference to FIG. 2, AC input from single or three-phase power supply is input to an EMI filter/transformer section 9 and 10, thence to a rectifier 11 and filter 12. The DC output of filter 12 is the DC voltage switched on and off by the power switches 15 under the control of the power drivers 16. This output is smoothed and filtered by the coasting diode and filter shown as 18.

Power drivers 16 are controlled by the output of pulse width modulator 22 as amplified and transformer coupled thereto by transformer 223. Pulse width modulator 22 is the heart of the control section which derives power from transformer 10 via a single secondary within the low voltage regulator 20. Pulse width modulator 22 has inputs from a variety of elements within the control section, including a battery overcharge control 21; a low bias control 256; a broken thermister control 251; a battery overtemperature control 254; and a constant current control 240. Pulse width modulator 22 also receives control inputs from the internal timer 300 and the charger thermostat S1. All of the above will be discussed hereinafter.

For convenience, the charger may be considered to be made of three subassemblies: the main chassis section, the control section, and the timer. Power is brought into the charger via the EMI filter section to the primary of transformer 10. Although not depicted in the figure, the EMI filter consists of one inductor placed in series with each phase of the input power. Feed-through filters are also placed in series with each phase and a wye configuration of capacitors, each having one end connected to a single phase of the input power after the series feed-through filters and the other end tied to chassis ground via a common mode noise reduction capacitor.

Figure 3:
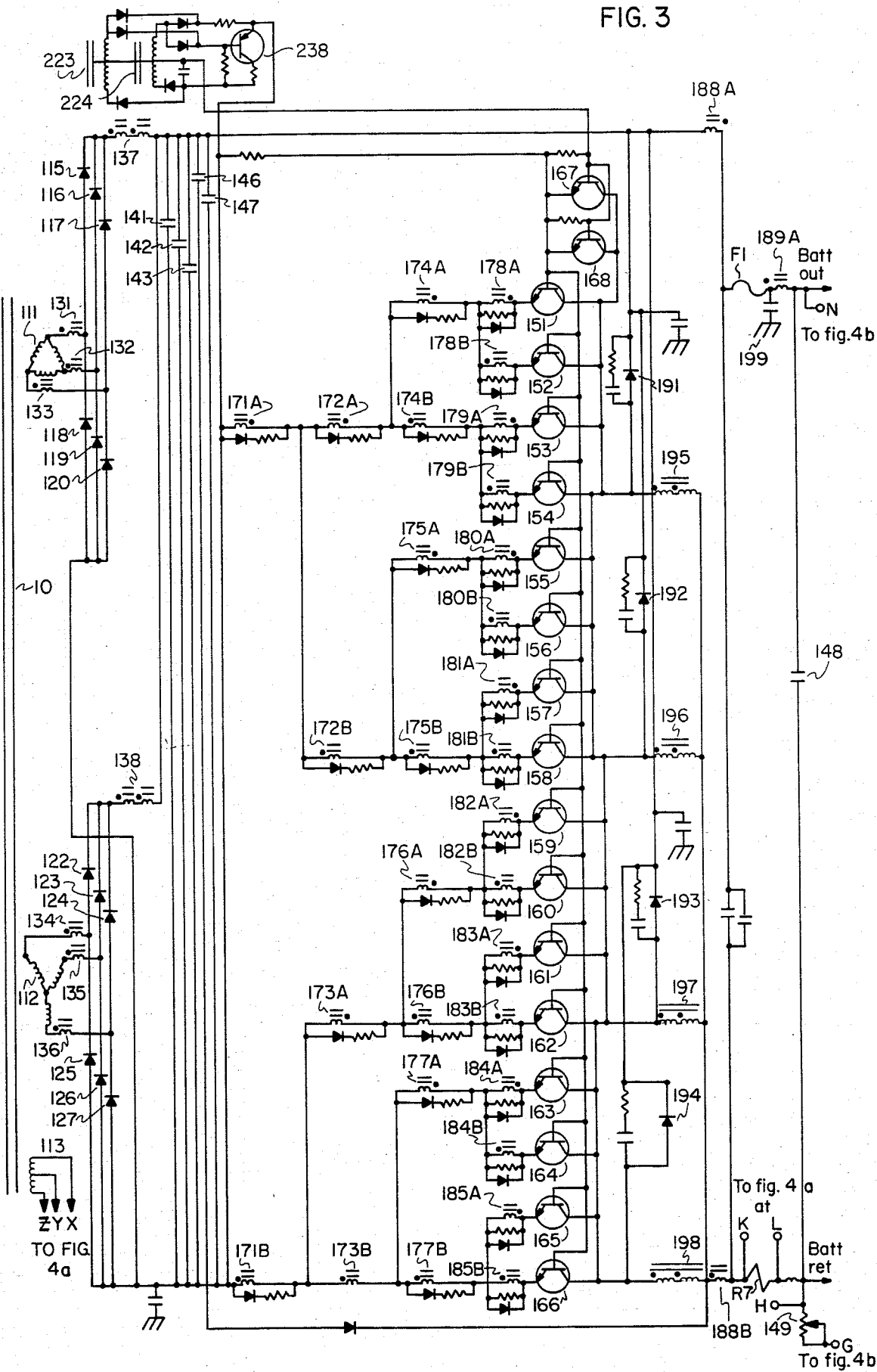
FIG. 3 is a partial schematic of the main chassis section.

Referring to FIG. 3, transformer 10 has three secondaries: a three phase Delta 111; a three phase Wye 112; and a single secondary 113, to supply power to the control circuitry.

The AC output of Delta 111 is rectified in the rectifier bank consisting of diodes 115-120, and the AC output from the Wye 112 is rectified by the rectifier bank consisting of diodes 122-127. Chokes 131 to 136 are in each of the AC output lines to the rectifier banks and are used to filer out high frequency spikes caused by the rectification, helping to smooth out the AC input current.

The two DC outputs of the rectifier banks are filtered by two chokes 137 and 138 respectively, and capacitors 141 to 143 and capacitors 146 and 147.

Transistors 151 to 166 perform the function of the power switches in the down pulser. Transistors 167 and 168 are the power drivers for the power switches. Each of the power switches will draw about 3.1 amperes and the two drivers will each draw about 2.4 amperes, making a total of 55 Amps maximum output current when each of the switches carry an equal amount of current. To assure that the switches share the current equitably, chokes 171-185 are used. The associated resistors and diodes are used to absorbe the transient energy in switching chokes 171-185 into the off condition, and they perform the reset function of the magnetic core used in the chokes.

Rectifiers 191-194 perform the function of the coasting diode. The associated resistor-capacitor networks around the coasting diodes are used to suppress the turn-on, turn-off transients from the coasting diodes. There are four output filter chokes 195-198 in parallel to handle the full load current. The capacitors for the output filters are designated 186 and 187. There are also two common mode filter chokes 188 and 189 consisting of a toroidal core with the output wires running through them. Chokes 188 and 189 are used to suppress the residual switching noise to quiet the output from an EMI standpoint. Capacitor 199 is used to bypass the noise to chassis ground.

Fuse F1 is mounted between chokes 188A and 189A, and is used to protect the battery from being charged in the event of a battery charger failure. The current shunt R7 is mounted between chokes 188B and 189B, and is used by the control circuitry to sense the current output from the supply, inasmuch as it provides the voltage drop which allows the charger to sense and provide the proper current under its programmed load. Capacitor 148 is used to make the signal clean of noise and the output quiet.

A thermostat S1 is used to shut the battery charger down if the internal temperature gets too high. Built-in test (BIT) indicator DS1, shown in FIG. 4, indicates when the charger has functioned improperly. An adjustment potentiometer 149 in FIG. 3 is used to adjust the output voltage and switch point for changing from constant current to constant voltage. Both BIT indicator DS1 and potentiometer 149 can be conveniently located on the front panel of the device.

Figure 4A:
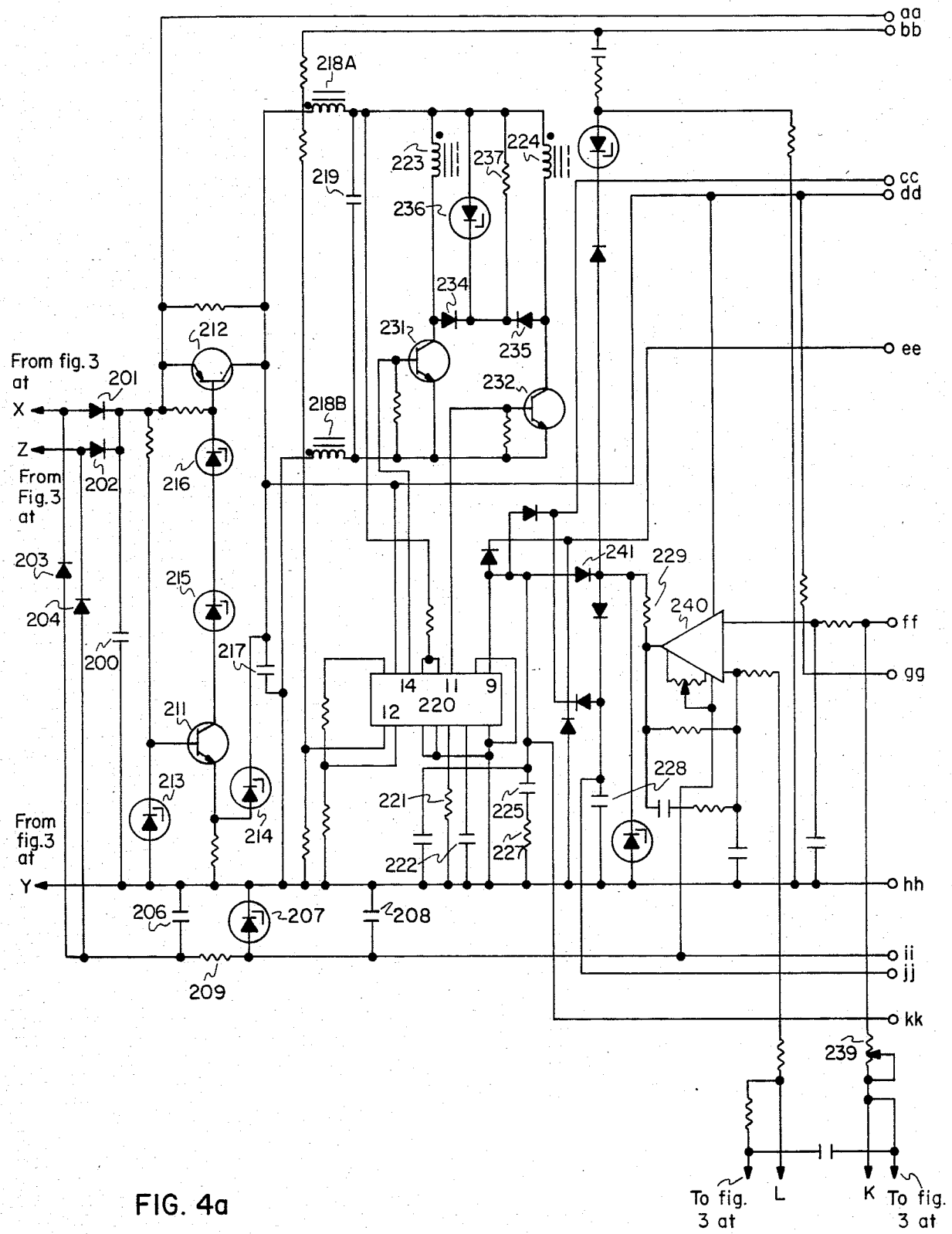
FIGS. 4a and 4b are a schematic of the control section.

The control circuitry will be discussed with reference primarily to FIGS. 4a and 4b. The control circuitry provides the various control functions and automatic switch-over from constant current to constant voltage mode. It also provides the various BIT features and an end of charge contact closure. To facilitate the discussion that follows, the control circuitry is broken down into nine sections, shown in two figures.

The first to be discussed is the low voltage regulator which derives input power from the single phase secondary 113 of transformer 110 as shown in FIG. 3. As shown in FIG. 4a, the AC voltage thus supplied is full wave rectified by diodes 201-204. The DC output resulting from this rectification is filtered by capacitor 200. The unregulated DC output voltage at nominal AC line voltage is approximately ±26.5 VDC. There is a regulator scheme for the positive voltage and a regulator scheme for the negative voltage. The negative voltage regulator and filter utilizes capacitor 206, resistor 209, zener diode 207, and capacitor 208 and provides a negative voltage of 5.6 volts at about 40 MA.

The positive voltage regulator utilizes transistors 211 and 212 and diodes 213-216 in the associated circuitry. The output voltage is approximately 19.7 volts DC at 1.2 amperes. This output voltage is filtered by capacitor 217 for the remainder of the non-pulsing portion of the control circuit and by the combination of inductors 218a and b and capacitor 219 for the pulsing portion of the circuitry.

The second section to be described is the pulse width modulator. The core of the switching regulator control is provided by a single microcircuit 220. This microcircuit produces pulses on pins 11 and 14 thereof. The width of the pulse is controlled in two ways: (1) by an input comparator on pins 1 and 2, and (2) by the control of pin 9. The frequency of the pulses is established by resistor 221 and capacitor 222 at approximately 10 kHz, which allows the output switch shown in FIG. 3 to operate at 20 kHz since the pulses are eventually input to the secondary of the pulse transformers 223 and 224 which are in parallel.

The control placed on pins 1 and 2 of microcircuit 220 is for over-voltage protection and is set slightly above the required maximum limit of the charger. In the event the battery voltage exceeds the maximum defined switchover point, the microcircuit 220 will shut down and provide no further pulses.

Pulse width control is applied via pin 9 with a diode or gate arrangement for both the constant current and constant voltage modes of operation. It will be noted that several other controls are OR-ed at this point as well. Specifically, these are the controls for broken battery temperature sensor, low bias detector which senses low AC line voltage, and battery over-temperature condition.

Capacitors 225 and 226 (FIG. 4b) and resistor 227 are used to stabilize the pulse width modulator 22 when operating in the over voltage condition. Capacitor 228 and resistor 229 provide for slow start-up to keep the peak currents in the switches 151–168 on the main chassis within reasonable limits.

The outputs of pulse width modulator 22 are amplified through transistors 231 and 232 and are transformer coupled through transformers 223 and 224 to the switch driver transistors 167 and 168, as shown in FIG. 3. It should be noted that the combination of diodes 234 and 235, zener diode 236 and resistor 237 on the primary of transistors 223 and 224 limits the back swing of the primary of the transformer to safe limits and allows the core of the transformer to be reset. Also note that transistor 238 is used to apply back bias to power switching transistors 151–168 during turn-off of the pulses, thereby said transistors may be turned off faster, thus limiting the power dissipation during turn-off.

The constant current control section utilizes microcircuit 240 to amplify the voltage obtained across the current shunt R7 shown in FIG. 3, and to pull pin 9 of microcircuit 220 down through diode 241 and resistor 222, thus limiting the pulse width output by microcircuit 220. The particular current limit set is controlled by the operation of transistors 243, 244, 245 and the end of charge transistor 246 and associated circuitry, all in FIG. 4b. The limits are adjustable with potentiometer 239 over a small range. In the exemplary circuit shown, the current limits set are: 10A short circuit; 15A trickle charge or constant voltage mode; 30A low rate of charging; and 55A high rate of charging. High rate charging is selected by the use of a high current jumper 403 which is left open for low rate of charging.

Figure 4B:
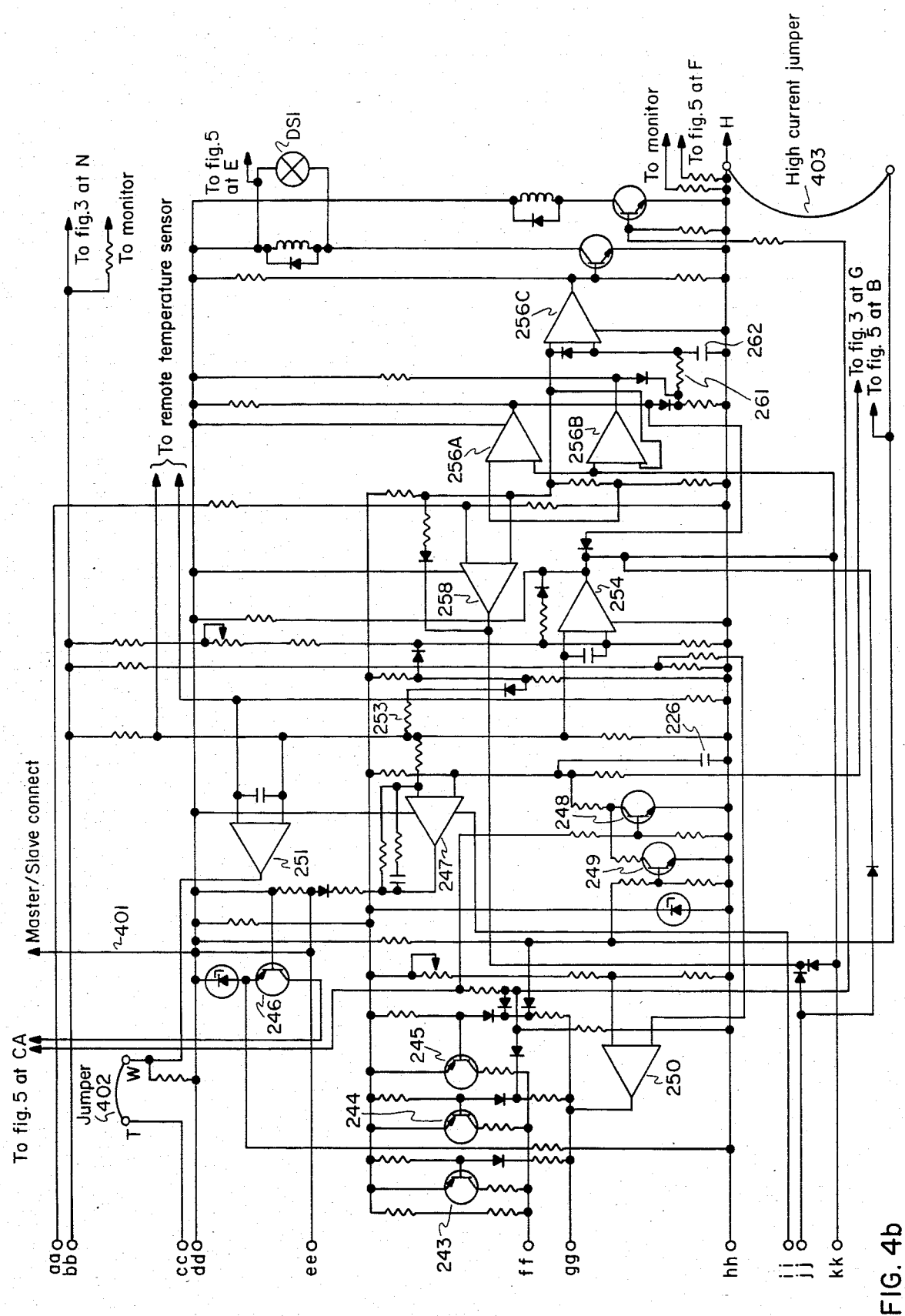

The constant voltage or trickle charge control utilizes microcircuit 247, shown in FIG. 4b, which is a high gain amplifier used to compare a portion of the output voltage with a programmable reference voltage, thereby determining both the end of charge for both rates of charge and the trickle charge voltage. This is accomplished by the output of 247 turning on the end of charge transistor 246, shifting both the current limit and the reference voltage through the action of transistor 248. End of charge transistor 246 also enables an end of charge relay, not shown, providing an external means of determining when the battery is fully charged. The action of transistor 249 is to set a different reference for end of charge, depending on the rate of charge, i.e., 30A or 55A.

The low battery voltage control limits the rate of charge to 10 amp when the battery to be charged has a voltage below 24 volts. Microcircuit 250 compares the battery voltage with a fixed reference and turns off transistors 243 to 245, thereby limiting the current to 10A when the battery voltage is less than 10 volts.

The broken thermister control utilizes microcircuit 251 to compare the voltage developed across resistor 253 with a portion of the output voltage. If the thermister used to sense the battery temperature is either broken or not present in the unit, microcircuit 251 stops the output of pulses from modulator 220 by its action on pin 9.

The battery over-temperature control utilizes microcircuit 254 to compare the portion of the output voltage developed from a fixed series of resistors which has the thermister in it. When the resistance of the thermister becomes too low due to the temperature of the battery becoming too high, the 254 will turn off the pulses out of microcircuit 220 by acting on pin 9 thereof. There is a built-in hysteresis so that the battery will have to cool off before the microcircuit 220 will allow the unit to resume charging the battery.

A built in test (BIT) circuit control utilizes microcircuits 256A, B, and C to determine the voltage on pin 9 of modulator 220, and if the voltage varies outside the range of 0.5 volts to 4.6 volts, the BIT circuit will be activated. The time constant of resistor 261 and capacitor 262 prevents false BIT indications.

Microcircuit 258 is used to compare a portion of the input DC voltage to the control circuit with a fixed reference. If this voltage gets too low the output of 258 will turn on, turning off the pulses of 220 through its action on pin 9 thereof.

Figure 5:
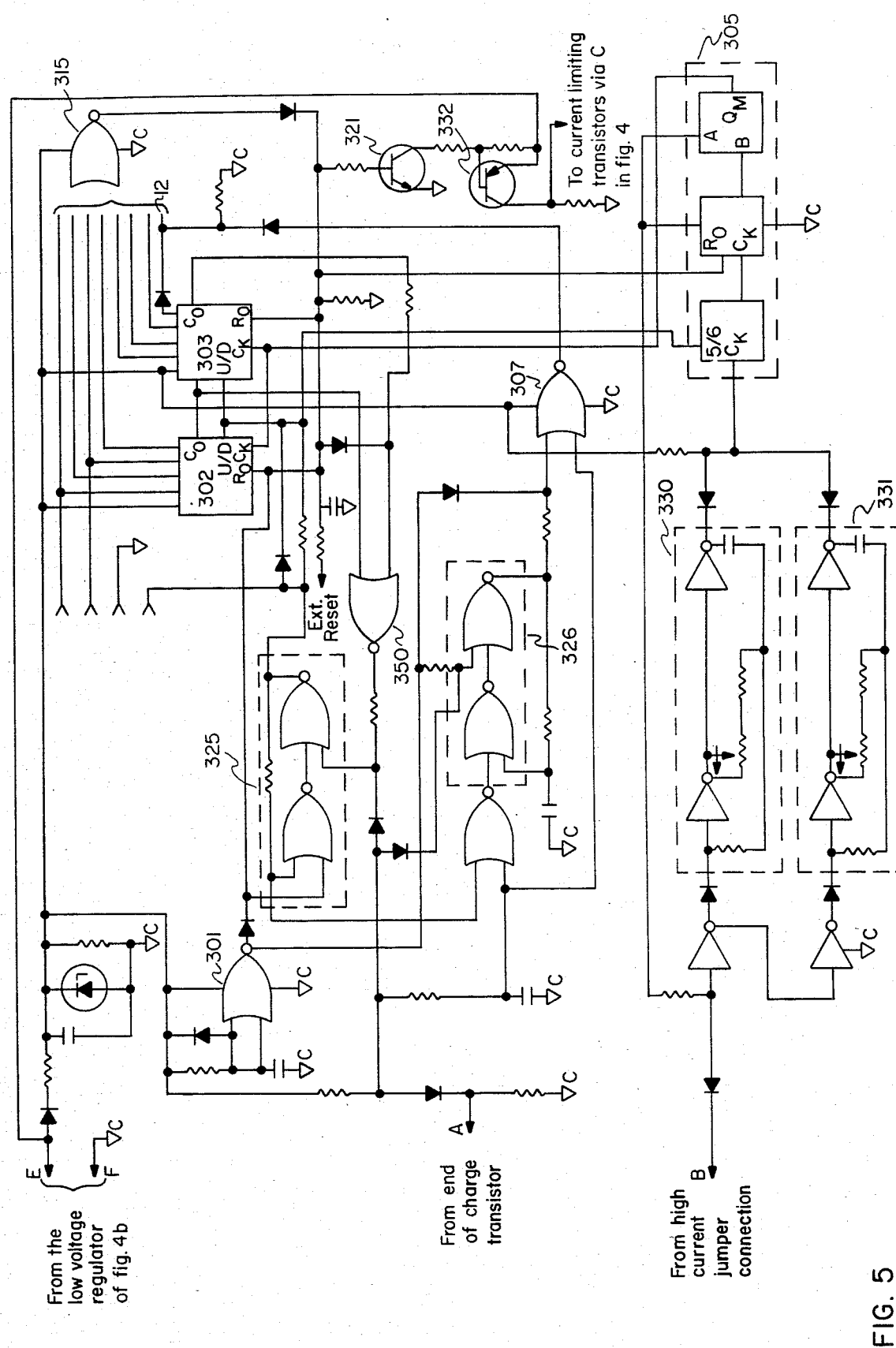
FIG. 5 is a schematic of the timer section.

The timer control is shown in FIG. 5. Microcircuit 301 provides a power-up reset to everything in the schematic for approximately seven seconds, (a) resets the binary counters 302 and 303 and the time base generator 305 and, (b) enables the recycle latch 326. After 301 drops out, line "A" determines whether a charge cycle is to take place. A high on line "A" holds the start gate 307 low. When "A" is or goes low, 307 comes high and puts an override on pin 12 of gate 315, forcing 315 low. When 315 is low, (a) all resets are grounded and (b) transistor 321 turns off and the cycle begins. Line "B" determines whether a fast count ("B" low) or a slow count ("B" high) is to be accumulated in the counters 301 and 302. A slow count utilizes the slow clock 330.

When line "A" comes high again the up-down latch 325 is set to the down state. However, if a count of 255 is reached before "A" comes high, latch 326 will set latch 325 since both carry outs of 301 and 302 are low together only at 255. Latch 326 also toggles the fault latch to prevent recycling bad batteries. When the count gets back to zero, the count comes high and the end of charge is recycled.

It should be noted that the battery charger is designed such that a master slave configuration may be employed which enables the combination to charge at a 110 A rate. When thusly configured, the broken thermister circuit for the slave unit must be disabled by leaving open the path from points T and W in FIG. 4b, since there will be no thermister connection to the slave unit. For the master unit, a jumper 402 must be placed between T and W.

Figure 6:
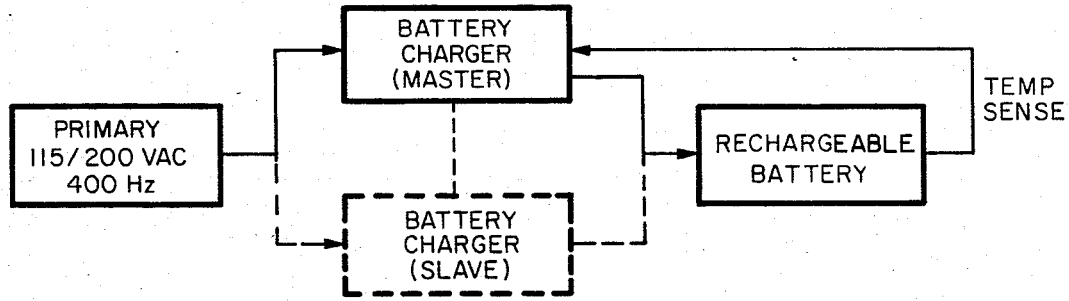
FIG. 6 is a block diagram showing the master slave configuration.

Furthermore, the master slave connector 401 must be connected between the units for synchronous operation. The block diagram of FIG. 6 illustrates the master slave configuration used to supply a 110 amp rate. The slave unit in essence supplies a parallel input to the battery.

It is to be understood that the embodiment herein described is intended to serve as an illustration of the invention and to that end a list of components for this embodiment is provided in Table I; howthe embodiment is not intended as any limitation thereof, inasmuch as there are modifications and alterations of the embodiment which remain within the spirit and scope of the invention as set forth in the appended claims.

| TABLE OF DESIGNATED COMPONENTS | | |
|---|---|---|
| Number | Component | Identifier |
| 110 | *Input Transformer | |
| 115-120 | **Diodes | IN3911 |
| 122-127 | " | IN3911 |
| 191-194 | " | IN3911 |
| 201-204 | " | IN5416 |
| 234-235 | " | IN4938 |
| 241 | " | IN4938 |
| 131-136 | Inductors (chokes) | * |
| 137,138 | " | * |
| 171 | " | * |
| 172-185 | " | * |
| 196-198 | " | * |
| 188 | " | * |
| 189 | " | * |
| 218 | " | * |
| 141-143 | Capacitors | 1200 uf, 1000 DC |
| 146,147 | " | 1200 uf, 1000 DC |
| 190,199 | " | .68 uf, 200 V |
| 148 | " | 1200 uf, 100 VDC |
| 186,187 | " | 1200 uf, 100 VDC |
| 206 | " | 82 uf, 30 V |
| 208 | " | 22 uf, 20 V |
| 217 | " | 82 uf, 30 V |
| 219 | " | 82 uf, 30 V |
| 222 | " | .022 uf, 50 V |
| 225 | " | .22 uf, 50 V |
| 226 | " | .047 uf, 100 V |
| 228 | " | 82 uf, 30 V |
| 262 | " | 180 uf, 6 V |
| 151-168 | **Transistor | 2N5038 |
| 211 | " | 2N2219 A |
| 212 | " | 2N3740 |
| 231,232 | " | 2N3735 |
| 238 | " | 2N2907 A |
| 243-245 | " | 2N2907 A |
| 248,249 | " | 2N2219 A |
| 321 | " | 2N2222 A |
| 332 | " | 2N2907 A |
| F1 | Fuse | 80 A |
| R1 | Shunt | MS91568-6 |
| DS1 | Built-in Test Indicator | M83287/01-28 |
| 209 | Resistor | 680 ohms, 2 W |
| 221 | " | 2.7 Kohms, 1/4 W |
| 227 | " | 3.3 K ohms, 1/4 W |
| 229 | " | 6.8 K ohms, 1/4 W |
| 237 | " | 5.6 K ohms |
| 253 | " | 1 K ohms, 1/8 W |
| 261 | " | 1 Meg ohms, 1/4 W |
| 149 | Potewntiometer | 1 K |
| 207,213 | Zener Diode | IN753A |
| 214 | " | IN9648 |
| 215,216 | " | IN750A |
| 236 | " | IN967B |
| 223,224 | Transformer | * |
| 220 | Microcircuit | |
| 240,247 | Microcircuit | JM38510/10101BGB |
| 250,251 | " | JM38510/11201BCB |
| 254,258 | " | JM38510/11201BCB |
| 256 | " | JM38510/11201BCB |
| 301,325 | " | 38510/5202BCB |
| 307,326 | " | 38510/5202BCB |
| 315 | " | MC14078BBCBS |

*The inductor values are a matter of design choice dependent upon the input voltage to the system.
**The semiconductors are identified by their generic JAN number, rather than any specific trade identification.

What is claimed is:

1. An apparatus for charging batteries comprising, in combination:
   a main power section including a transformer-input EMI filter section, a rectifier filter section, and a power switching section, and having a battery output line and a battery return line;
   a control section including a low voltage regulator providing low voltage power to the control section from said main power section, a pulse width modulator and output driver section providing driver signals to said power switching section, a constant current control circuit for maintaining a constant current output of said apparatus operably connected to said pulse width modulator, a constant voltage control section operably connected to sense a portion of the output voltage and to supply a control signal to said pulse width modulator, and a battery over-temperature control operably connected to sense battery temperature and to provide a control signal to said pulse width modulator; and
   a timer section operably connected to provide temporal control over said apparatus, subject to the charging current used, the output voltage, and the battery temperature as monitored by said control section, and providing to said control section an end of charge indication.

2. The apparatus of claim 1 further comprising:
   a low battery control for limiting the output current of said apparatus when the output voltage of a battery to be charged is below a predetermined level, operably connected to sense said battery output voltage and to provide a control signal to said pulse width modulator;
   an inoperable thermister control connected to compare an internal voltage with a portion of the output voltage of the apparatus and to turn off said pulse width modulator if said comparison exceeds a predetermined tolerance; and
   a low bias control connected to compare a portion of the input DC voltage to the control section with a fixed reference end to turn off said pulse width modulator if said input voltage is too low.

3. The apparatus of claim 2 wherein said transformer EMI filter section provides three phase power to said power switching section via said rectifier filter section, and a low power supply to said control section.

4. The apparatus of claim 2 wherein said power switching section comprises:
   a plurality of power switches for supplying power from said main power supply to a battery to be charged, operably connected therebetween;
   means for cooperatively driving said power switches in accordance with signals from said control section, operably connected therebetween; and
   means for assuring equal current across each power switch, operably connected thereto.

5. The apparatus of claim 4, wherein:
   said means for cooperatively driving said power switches are two transistors connected in parallel to said control circuit, each having the base thereof connected to one side of said pulse width modulator output and each having the emitter thereof connected to the other side of said pulse width modulator output, having a resistive element connected between the respective base and emitters thereof; and
   said power switches are each a transistor having the base thereof connected in parallel to the emitters of said power drivers, the emitters of each power switch being connected to said equal current assuring means and the collector thereof connected in parallel to the collector of each power driver, said power switches controlling the current through said battery return line.

6. The apparatus of claim 5, further comprising:

a plurality of coasting diodes each having its cathode connected to one side of said rectifier and its anode connected to the collector of a number of said power drivers;

a resistor-capacitor transient suppression network connected in parallel with each coasting diode;

a plurality of output filter chokes each connected on one side to the anode of one of said coasting diodes and connected on the other side to a common point;

a pair of common mode filter chokes each having two inputs and two outputs, the first having inputs connected to said rectifier filter section at the same point as the cathodes of said coasting diodes and to said rectifier filter section at a common point with said output filter chokes, the second common mode filter choke being connected between said first common mode filter choke and the battery output line and the battery return line, whereby each common mode filter choke is in both the battery out and battery return line.

7. The apparatus of claim 5 wherein said equal current assuring means comprises:
a first plurality of inductors, each inductor thereof connected to the emitter of one of said power switches;
a plurality of resistors, each resistor thereof connected in parallel with each inductor of said plurality of inductors;
a plurality of diodes, each diode connected in parallel with one of said resistors and said inductors, such that the cathode thereof is connected to the emitter of a power switch;
a second plurality of inductors, each inductor thereof connected serially to two inductors from said first plurality of inductors;
a first plurality of serial resistor diode networks, each of said networks connected in parallel with an inductor from said second plurality of inductors;
a third plurality of inductors, each inductor thereof serially connected to two inductors from said second plurality of inductors;
a second plurality of serially connected resistor diode networks, each of which is connected in parallel with an inductor from said third plurality of inductors;
a fourth plurality of inductors, each serially connected to two inductors from said third plurality of inductors; and
a third plurality of serially connected resistor-diode networks, each connected in parallel with said fourth plurality of inductors, each of said fourth plurality of inductors also being connected to the same output of said control section as are the emitters of said power drivers and to the return side of said rectifier filter section.

8. The apparatus of claim 2 wherein said main power supply further comprises a fuse serially connected in said battery output line, and a shunt serially connected in said battery return line.

9. The apparatus of claim 2 wherein said low voltage regulator comprises:
an input transformer having a center tapped secondary, a full wave rectifier, receiving input from said input transformer, having a positive and a negative output;
a negative voltage regulator formed by a first capacitor connected between the negative outputs of said full wave rectifier and said center tap of said input transformer, a resistor connected to the junction of said first capacitor and said input transformer's negative output, a zener diode connected between said resistor and said input transformer center tap, and a second capacitor connected parallel to said zener diode; and
a positive voltage regulator including a first transistor having its base resistively coupled to the positive output of said rectifier, a first zener diode connected between the base of said first transistor and the center tap of said input transformer, said first transistor having its emitter connected to said center tap via a resistive element; a second zener diode having its anode connected to the emitter of said first transistor, a third zener diode having its anode connected to the collector of said first transistor, a fourth zener diode having its anode serially connected to said third zener diode, a second transistor having its base resistively connected to said positive output of said rectifier and having its base connected directly to the cathode of said fourth zener diode, its emitter connected to the output of said rectifier and its collector connected to the anode of said second zener diode, thereby providing a pulsing and non-pulsing positive voltage output to said control section, said non-pulsing output filtered by a filter capacitor connected between the junction of said second zener diode with said second transistor and the center tap of said input transformer, with said pulsing voltage output filtered by the combination of a first filter inductor connected to the collector of said transistor, a second filter inductor connected on one side between said filter capacitor and said transformer, and a second filter capacitor connected between the output of said first and second filter inductors.

10. The apparatus of claim 9 wherein said pulse width modulator section comprises:
means for producing pulses, having an internal input comparator and a control pin whereby an external input can control the width of said pulses;
a voltage divider network connected between the center tap of said input transformer and one input of said internal input comparator;
means for sensing battery voltage connected to one input of said internal comparator;
a first transistor amplifier having its base connected to one pulse output of said pulse producing means, said base resistively coupled to the output of said second filter inductor of said low voltage regulator, the emitter of said transistor amplifier connected to said second filter inductor;
a driver switch transformer having two primaries and a center tapped secondary, each primary connected on one side to said first filter inductor, and one of said primaries operably connected to the collector of said first amplifier transistor;
a second amplifier transistor operably connected to said pulse producing means for amplifying said pulses produced thereby and transmitting them to the secondary of said driver switch transformer in the same manner as said first transistor amplifier.

11. The apparatus of claim 5 wherein said low voltage regulator comprises:
a center tapped input transformer providing a positive or negative output;

a negative voltage regulator having a filtered output; and a positive voltage regulator capacitively filtered for a non-pulsing output and inductively filtered for a pulsing output, said positive and negative voltage regulators operably connected to said input transformer.

12. The apparatus of claim 11 wherein said pulse width modulator section comprises:

a pulse producing microcircuit having two outputs and also having control inputs for modifying the operation and output thereof;

means for sensing battery overcharge operably connected to a control input of said microcircuit;

pulse amplifiers operably connected to the output of said pulse producing microcircuit and to said positive voltage output of said low voltage regulator, having an output;

pulse transformers operably connected through their primaries to the output of said pulse amplifiers, and having center tapped secondaries providing pulses to said switch driver transistors.

13. The apparatus of claim 12 wherein said constant current control section comprises:

voltage amplification means operably connected to amplify a voltage developed across said shunt in said battery return line, having an output therefrom connected to a control input of said pulse producing microcircuit; and means for selecting a predetermined current limit operably connected to said voltage amplification means.

14. The apparatus of claim 13 wherein said current level selecting means comprises:

first, second and third current limiting transistors providing a parallel input to said voltage amplification means;

a jumper removably connected between the bases of said current limiting transistors and the center tap of said low voltage regulator transformer; and an end of charge transistor operably connected to alter the operation of said current limiting transistors and to receive a signal from said timer circuitry.

15. The apparatus of claim 14 wherein said constant voltage control comprises:

means for comparing the battery output voltage with a predetermined reference to determine the end of charge, providing an output signal to the base of said end of charge transistor to turn on said transistor when the end of charge is reached;

a first reference voltage transistor operably connected to said current limiting transistors to change the reference voltage applied thereto when the end of charge is reached; and a second reference voltage transistor operably connected to said current limiting transistors to provide a selectable reference voltage thereto in accordance with the position of said removably connected jumper.

16. The apparatus of claim 14 further comprising a low battery voltage control means for comparing the output voltage of a battery to be charged with a predetermined reference, operably connected to turn off said current limiting transistors if said output voltage is below said predetermined reference.

17. The apparatus of claim 12 further comprising:

a thermister used to sense battery temperatures;

a resistive element operably connected to said thermister, forming a voltage divider network therewith;

means for comparing the voltage developed across said resistive element to a portion of the output voltage to determine the operability of said thermister, having an output; and a second jumper removably connected between said comparing means output and said control input of said pulse producing microcircuit.

18. The apparatus of claim 17 wherein said battery overtemperature control comprises:

means for comparing a portion of the output voltage to a portion of the voltage developed across said thermister and the voltage divider network formed therewith to determine battery temperature, having an output to said control input of said pulse producing microcircuit.

19. The apparatus of claim 12 further comprising a low bias control means for comparing the DC input to said control section with a fixed reference operably connected to sense said DC input at the positive output of said control system rectifier, and having an output to the control input of said pulse producing microcircuit.

20. The apparatus of claim 2 wherein said timer section comprises:

a fast clock having an output;

a slow clock having an output;

logic means for selecting either said fast clock or said slow clock in accordance with a signal received from said control section;

a time base generator connected to the output of said fast and slow clocks, having an output, a reset input and a control input for varying the output rate of said time base generator;

two up/down counters operably connected to receive input from the output of said time base generator and each having an output;

second logic means operably connected to the output of said up/down counters for determining when a predetermined count has been reached in each counter;

latching means receiving input from said second logic means and from said control section, each input causing said latch to output a signal to said up/down counters, changing said count from up to down, and changing the rate of said time base generator;

fault latching means receiving a toggle input from said down latching means to prevent recycling batteries;

a start gate receiving an input from said control section derived from the output voltage of the battery to be charged and having an output;

a recycle latch operably connected to said up/down counters and having an input from said start gate;

means for supplying reset signals for initiation of a battery charging cycle having outputs to said time base generator, said up/down counters, said down latch, said fault latch, and to enable said recycle latch; and output means for supplying an end of charge signal to said control section.

* * * * *